Feb. 28, 1956 E. A. PORTER 2,736,807
PROBE FOR GRID DIP METERS
Filed Nov. 12, 1953 2 Sheets-Sheet 1
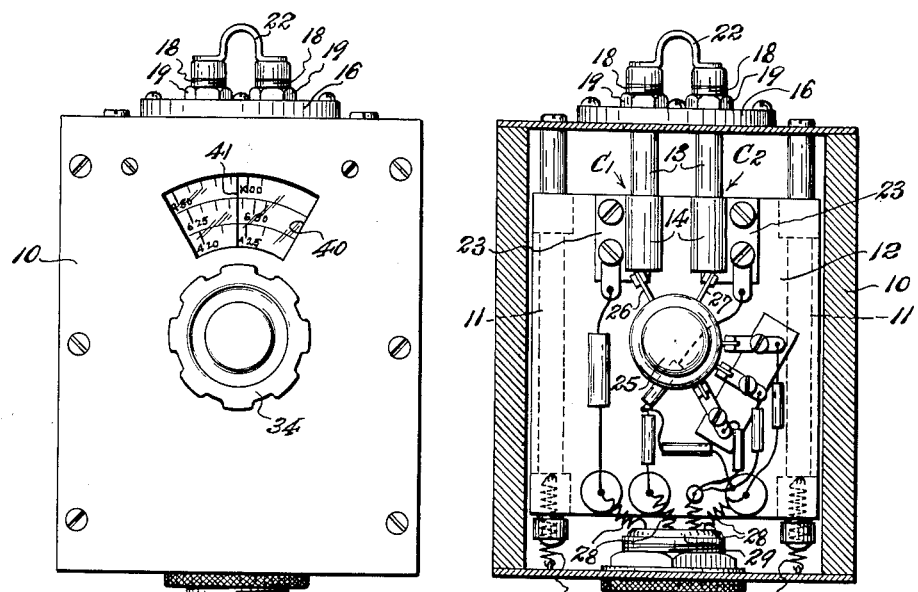
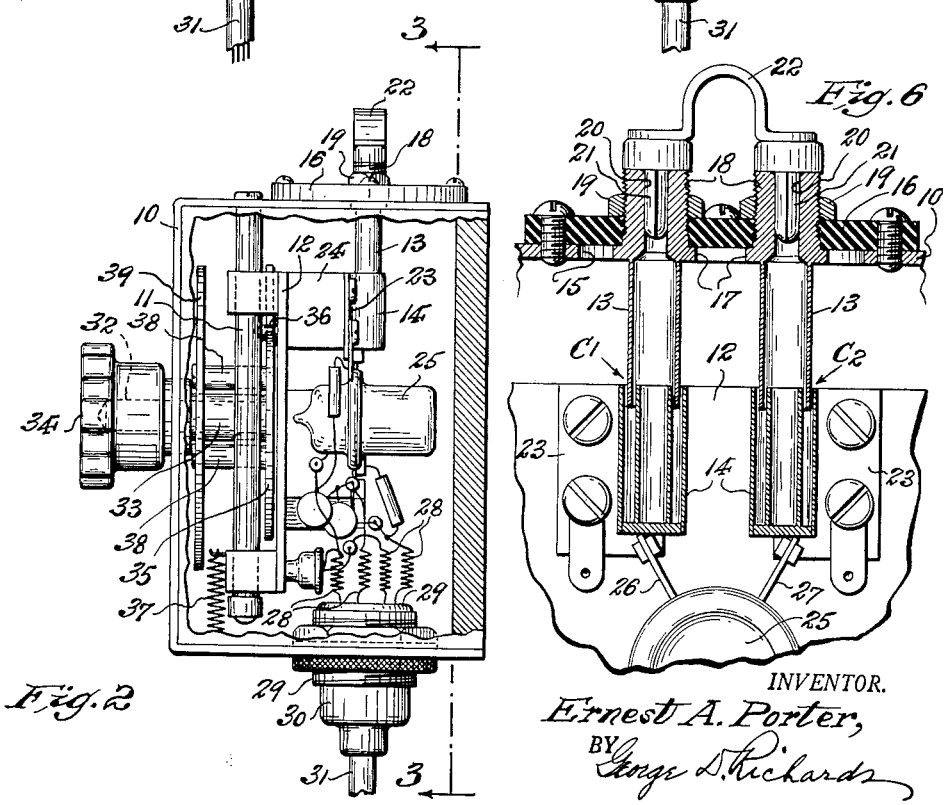
INVENTOR.
Ernest A. Porter,
BY George D. Richards
Attorney

United States Patent Office 2,736,807
Patented Feb. 28, 1956

2,736,807

PROBE FOR GRID DIP METERS

Ernest A. Porter, Denville, N. J., assignor to Boonton Electronics Corporation, Boonton, N. J., a corporation of New Jersey Application November 12, 1953, Serial No. 391,475

5 Claims. (Cl. 250—36)

This invention relates to tunable electronic devices known to the art as grid dip meters which normally operate as an oscillator or detector of radio frequencies.

A grid dip meter comprises two parts, namely, (1) a power supply and indicator unit, containing a rectifier and voltage regulator, necessary switching means, and an indicating meter, and (2) a probe provided with frequency indication means, and a receptacle for interchangeable inclusion in its tuning circuit of selected range changing coils; the probe being connected by flexible cable to the power supply and indicator unit. Used as an oscillator, the grid dip meter will give an indication, which appears as a dip on the scale of the indicator unit, when the probe is coupled to a resonant circuit tuned to the same frequency. Operating as a detector, the grid dip meter will give an indication, which appears as a peak on the scale of the indicator unit, when the probe is tuned to the correct frequency in the presence of radio frequency signals.

More particularly, this invention has reference to improvements in the probe member of a grid dip meter.

In grid dip meters heretofore available, the probe members thereof are adapted to operate only in a limited range of ultra high frequency not in excess of approximately 400 megacycles. This appears to be due in part to the fact that the capacitors in the tuning circuit thereof are of the rotary type requiring wiping electrical contacts, and involving rather high effective circuit capacitance, so that both capacitors and range changing coils of impractical size would be necessary for performance of the probe member in the ultra high frequency range beyond 400 megacycles.

Having the above limitations of probe members of heretofore available grid dip meters in view, it is an object of this invention to provide a novel improved form and construction of probe member for a grid dip meter which can be operated in a range of ultra high frequency (UHF) of from 300 to 1000 or more megacycles (mc.), and with interchangeable range changing coils of reasonable size.

It is a further object of this invention to provide a probe member for a grid dip meter with an improved form and construction of capacitors; which require no wiping electrical contacts; which are operative at minimum effective capacitance to serve both for tuning effect and for coupling selected range changing coils of reasonable size in a series tuned circuit with the oscillator or detector tube of the probe; together with novel means for adjusting the movable elements relative to the stationary elements of said capacitors by means of a manually rotatable continuously changing ratio drive cam, so that a frequency indicating dial, which rotates with said cam, can be calibrated approximately linear in frequency indication notwithstanding that effective circuit capacitance regulation is non-linear.

The above and other objects will be understood from a reading of the following description of this invention in connection with the accompanying drawings which show my improved probe member for a grid dip meter, the power supply and indicator unit of said meter being omitted, since the construction and operation of the latter is well known to the art. In said drawings:

Fig. 1 is a front elevational view of a probe member according to this invention; Fig. 2 is a side elevational view of the same, with the housing wall broken away to disclose internal parts; and Fig. 3 is a rear face view of the interior of the probe member, the walls of the enclosing housing being shown in section.

Fig. 6 is a fragmentary view also similar to that of Fig. 3, but showing the capacitors in longitudinal section, this view being drawn on an enlarged scale.

Similar characters of reference are employed in the above described views, to indicate corresponding parts.

Figure 4:
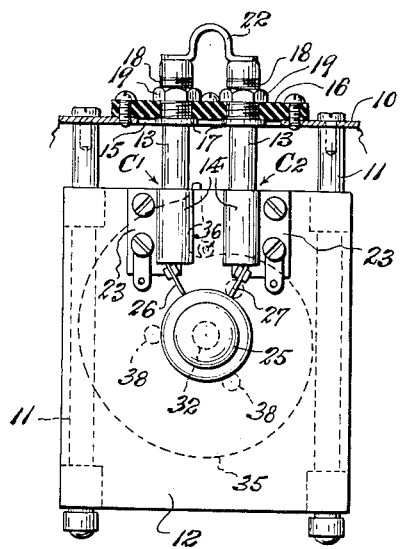
Fig. 4 is a fragmentary view similar to that of Fig. 3, but showing the lower limit of regulative movement of the capacitors as effected by operation of the drive cam which controls such regulative movement.

Referring to the drawings, the reference character 10 indicates the housing which contains the variable capacitors, the oscillator or detector tube and the series tuned circuit connections therefor, which constitute elements of the probe member structure. Dependent from the top wall of the housing 10, within the housing interior, are a pair of laterally spaced, parallel guide rods 11. Supported by and across said guide rods 11, subject to up and down sliding movement thereon, is a carriage plate 12. Laterally spaced apart variable capacitors $C_1$ and $C_2$ are positioned between the movable carriage plate 12 and the top wall of the housing 10. These variable capacitors are each of a novel form comprising telescopically related tubular plate members which are relatively movable axially, and therefore in straight line. Each variable capacitor comprises a stationary tubular plate member 13 and a movable tubular plate member 14. Either of these plate members may comprise a single tubular element or a plurality of concentrically spaced tubular elements. In an illustrative form as shown, the stationary tubular plate member 13 of each variable capacitor comprises a single metallic tube, and the movable tubular plate member 14 thereof comprises a pair of concentrically spaced metallic tubes between which the tubular plate member 13 is telescopically received. (See Fig. 6.)

The stationary tubular plate members 13 of the variable capacitors $C_1$ and $C_2$ are supported, in suitably spaced apart relation, so as to depend within the upper interior of the housing 10. To this end, the top wall of the housing 10 is provided with an opening 15 which is bridged by an insulator base 16 that is suitably secured to said housing top wall, preferably so as to overlie the outer surface thereof. Each stationary tubular plate member 13 is provided at its upper end portion with an annular stop shoulder 17, above which projects an externally screw-threaded anchoring shank 18; these parts being preferably integral with said tubular plate member 13. The insulator base 16 is provided with laterally spaced apart openings through which anchoring shanks 18 of stationary tubular plate members 13 of respective capacitors $C_1$ and $C_2$ extend, to project externally above the insulator base 16, when the stop shoulders 17 are abutted against the underside of the latter. Said stationary tubular plate members 13 of respective capacitors $C_1$ and $C_2$ are secured in the described supported relation to the insulator base 16 by fastening nuts 19, which are threaded onto the externally projecting anchoring shanks 18 thereof. The insulator base 16 thus serves to insulate the capacitors $C_1$ and $C_2$ one from the other. Formed in the anchoring shanks 18 of respective stationary tubular plate members 13 are axial sockets 20, which serve to detachably receive coupling prongs 21 of a selected range changing coil 22 that is to be electrically connected across the variable capacitors $C_1$ and $C_2$.

The movable tubular plate members 14 of the capacitors $C_1$ and $C_2$ are carried by the carriage plate 12. Each movable tubular plate member 14 is provided with an anchoring base 23 that is suitably secured to an insulator block 24 mounted on the upper end portion of the carriage plate 12, and which is so disposed thereon as to axially align the movable tubular plate member supported thereby with a stationary tubular plate member 13 with which it is to cooperate so as to form a variable capacitor.

Figure 7:
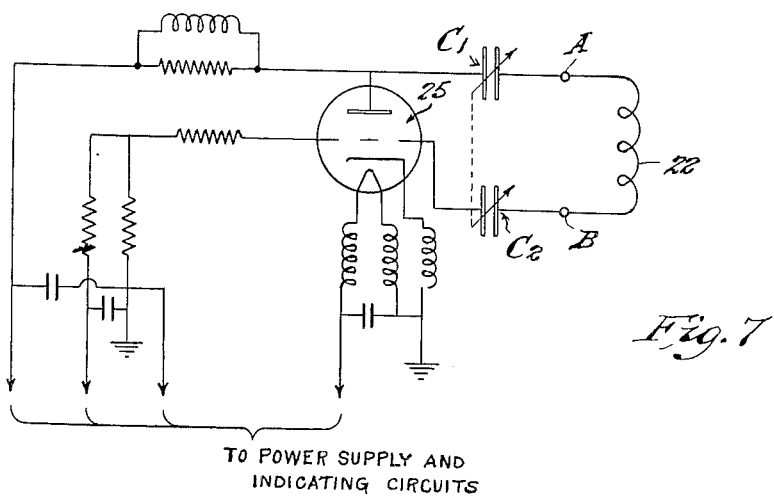
Fig. 7 is a wiring diagram showing the series tuned frequency determining circuit of the probe member.

Also carried by the carriage plate 12 is an oscillator or detector tube 25, the plate terminal 26 of which is connected with the movable tubular plate member 14 of the variable capacitor $C_1$, and the grid terminal 27 of which is connected with the movable tubular plate member 14 of the variable capacitor $C_2$. Also carried by the carriage plate 12 are the electrical circuit elements by which the associated tube 25, capacitors $C_1$ and $C_2$ and range changing coil 22 are connected to the power supply and detector unit of the grid dip meter of which the probe member is a part. These circuit elements will be understood by reference to the wiring diagram of Fig. 7. Extensible terminal portions 28 of said circuit elements are connected to an outlet member 29 having multiple sockets (not shown) to detachably receive corresponding prongs (not shown) of a coupling plug 30 which couples the conductors of a cable 31 leading from the probe member to the power supply and indicator unit part of the grid dip meter. Said outlet member 29 is suitably affixed to the bottom wall of the probe member housing 10 (see Figs. 1, 2 and 3).

The means for manually regulating the variable capacitors $C_1$ and $C_2$ by transmitting up or down movement to the carriage plate 12 comprises a shaft 32 which is rotatable in a bearing means 33 mounted on the front wall of the housing 10. Fixed on the external end of said shaft 32 is a finger piece or knob 34 by which the shaft 32 can be manually rotated. Suitably attached to the internal end of said shaft 32, so as to turn therewith adjacent to the carriage plate 12, is a drive cam 35 of the continuously changing ratio type. Mounted on the carriage plate 12 is a roller stud 36 adapted to be operatively engaged by the drive cam 35, whereby to transmit capacitor regulating movement to the carriage plate 12. To cause the roller stud 36 to follow the cam 35, suitably anchored pull springs 37 are connected between the carriage plate 12 and the housing 10 to bias said carriage plate and its roller stud toward said cam.

Connected with the drive cam 35 by intermediate offsetting spacer supports 38, so as to turn therewith, is a dial member 39, which is disposed to lie adjacently behind the front wall of the housing 10. Said front wall of the housing 10 is provided with a suitably shaped and positioned opening 40 through which the face of the dial member 39 can be observed. Said opening 40 is suitably glazed, and is provided with an indicator hair line 41, with reference to which calibrated frequency indicating scales, which are inscribed upon the face of the dial member 39, can be read. The frequency indicating scales of the dial member relate to frequency ranges as determined by selected range changing coils 22 employed in use of the grid dip meter. Ordinarily, three range changing coils will be available for use, one operative for frequency determination in the range of 300 to 425 mc.; another operative in the range of 425 to 650 mc.; and a third operative in the range of 650 to 1000 or more mc. Since frequency differentiation and effective capacitance is non-linear, the continuously changing ratio drive cam 35 functions to compensate for these conditions, so that the scales of the dial member 39 can be calibrated approximately linear for frequency indication.

Figure 5:
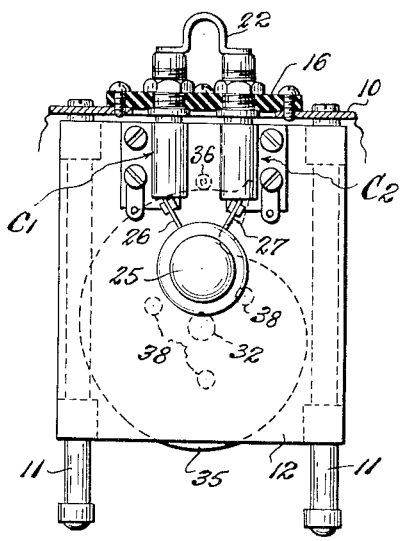
Fig. 5 is a similar view, showing the upper limit of regulative movement of the capacitors.

It will be obvious that, in the use of the probe member, series tuning in a resonant circuit is attained by rotating the drive cam 35, whereby to adjust the movable tubular plate members 14 of the capacitors $C_1$ and $C_2$ relative to the stationary tubular plate members 13 thereof. When the resonant circuit is thus tuned, the frequency involved will be indicated on the particular scale of the dial member 39 corresponding to the range of an appropriate selected range changing coil 22 in use. When the tubular plate members of the capacitors $C_1$ and $C_2$ are separated to the extent of the downward limit of movement of the carriage plate 12 (see Fig. 4), said capacitors operate at minimum tuning capacity, while, on the other hand, when said tubular plate members are closed one upon the other to the extent of the upward limit of movement of the carriage plate 12 (see Fig. 5), said capacitors operate at maximum tuning capacity; the operative tuning capacity of $C_1$ and $C_2$ can therefore be regulated by movement of the carriage plate 12 between the aforesaid lower and upper limits.

By way of example, if the capacitance range of each capacitor $C_1$ and $C_2$ operates from 1.0 micromicrofarad to 3.5 micromicrofarads, the capacitors will provide sufficient capacity coupling to sustain oscillation in the UHF range of 300 to 1000 or more megacycles, and will enable the tuned circuit to be tuned through a frequency ratio of 1.0 to 1.6. When the capacitors $C_1$ and $C_2$ are at a minimum, or 1.0 micromicrofarad position, the total effective capacitance across the operating coil 22 at points A—B (see Fig. 7) of the resonant circuit when a 6F4 triode tube is used, is reduced to approximately 0.4 micromicrofarad according to the following equation for series capacitance, viz.:

wherein $$C_{\text{eff}} = \frac{1}{\frac{1}{C_t} + \frac{1}{C_1} + \frac{1}{C_2}}$$

$C_{\text{eff}}$ = total capacitance across the coil at points A—B
$C_t$ = total capacitance of oscillator or detector tube 25
$C_1$ and $C_2$ = coupling capacitance from coil 22 to tube 25

Accordingly, when coil 22 is about .06 microhenry and the effective capacitance is 0.4 micromicrofarad, the tuned circuit of the oscillator or detector will resonate at a frequency of approximately 1000 megacycles.

The manner of coupling a grid meter equipped with the novel probe member of this invention to circuits to be measured for UHF will be well understood by those skilled in the art, and consequently need not be herein amplified. It may be said however that a grid dip meter equipped with the novel probe member of this invention is well adapted for many uses in the UHF field, such e. g., as measurement of capacity, inductance circuit Q, and choke resonance; and can also be used as an auxiliary signal generator; an absorption wave meter, and as means to determine the frequency of unknown RF signals and parasitics. It may also be used as a field strength meter, and for many other applications.

Having now described my invention, I claim:

1. A probe for a grid dip meter comprising a series tuned circuit including an oscillator tube, a pair of variable capacitors and a UHF range changing coil, wherein said capacitors each comprise a stationary tubular plate member and a cooperative movable tubular plate member in telescopic relation, a movable carriage by which the movable tubular plate members of the capacitors and the oscillator tube are carried, means to connect the plate of the tube to the movable tubular plate member of one capacitor and means to connect the grid of said tube to the movable tubular plate member of the other capacitor, means to connect the tube in the power supply and indicating circuits of the grid dip meter, a manually rotatable drive cam to actuate the carriage for tuning control of the capacitors, means to detachably connect a range changing coil across the stationary tubular plate members of the capacitors, and a dial member rotatable with said drive cam and calibrated to indicate UHF in range from 300 to 1000 mc.

2. A probe for a grid dip meter as defined in claim 1 wherein the means to detachably connect a range changing coil across the capacitors comprises coupling prongs respectively extending from opposite ends of said coil, said stationary tubular plate members of the capacitors being provided with outwardly open sockets to respectively receive respective coupling prongs of the coil.

3. A probe for a grid dip meter comprising a housing, a movable carriage plate, guide means affixed to and within the housing to slidably support said carriage plate, a pair of variable capacitors each comprising a stationary tubular plate member and a cooperative movable tubular plate member in telescopic relation, means to mount the movable tubular plate members of said capacitors on the carriage plate in insulated relation thereto and one to the other, means to attach the stationary tubular plate members of said capacitors to the housing in insulated relation thereto and one to the other, means to mount the tube on said carriage plate with its plate member connected to the movable tubular plate member of one capacitor and its grid connected to the movable tubular plate member of the other capacitor, means to connect said tube in the power supply and indicating circuits of the grid dip meter, a range changing coil, means to detachably connect said range changing coil across the stationary tubular plate members of the capacitors, said tube, capacitors and range changing coil as thus connected forming a series tuned circuit, a manually rotatable drive cam supported by said housing and operative to actuate the carriage plate for tuning control of the capacitors, and a dial member rotatable with said drive cam and calibrated to indicate frequency.

4. A probe for a grid dip meter as defined in claim 3, wherein the means to detachably connect a range changing coil across the capacitors comprises coupling prongs respectively dependent from opposite ends of said coil, said stationary tubular plate members of the capacitors being provided in their housing attached end portions with axial outwardly open sockets to respectively receive respective coupling prongs of said coil.

5. A probe for a grid dip meter as defined in claim 3 wherein the carriage plate actuating drive cam is of the continuously changing ratio type, the carriage plate having a roller stud engageable by the periphery of said drive cam, and pull spring means being provided to bias the carriage plate and its roller stud in following relation to the drive cam.

References Cited in the file of this patent
UNITED STATES PATENTS

| | | |
|---|---|---|
| 2,091,109 | Shiepe | Aug. 24, 1937 |
| 2,135,672 | Morris et al. | Nov. 8, 1938 |
| 2,203,329 | Goldman | June 4, 1940 |
| 2,315,945 | Downey | Apr. 6, 1943 |
| 2,414,991 | Wheeler | Jan. 28, 1947 |
| 2,469,990 | Quayle et al. | May 10, 1949 |
| 2,681,434 | Wheeler | June 15, 1954 |
| 2,682,642 | Podolsky | June 29, 1954 |
| 2,717,313 | Pan | Sept. 6, 1955 |